Jan. 15, 1957 R. B. HUSSEY 2,777,915
REGULATOR
Filed May 18, 1953 3 Sheets-Sheet 1

INVENTOR.
RUSSELL B. HUSSEY
BY Raymond A. Paquin
ATTORNEY.

Jan. 15, 1957
R. B. HUSSEY
2,777,915
REGULATOR
Filed May 18, 1953
3 Sheets-Sheet 3
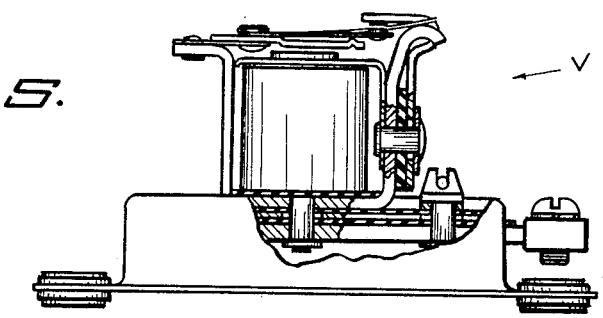
Fig. 5.
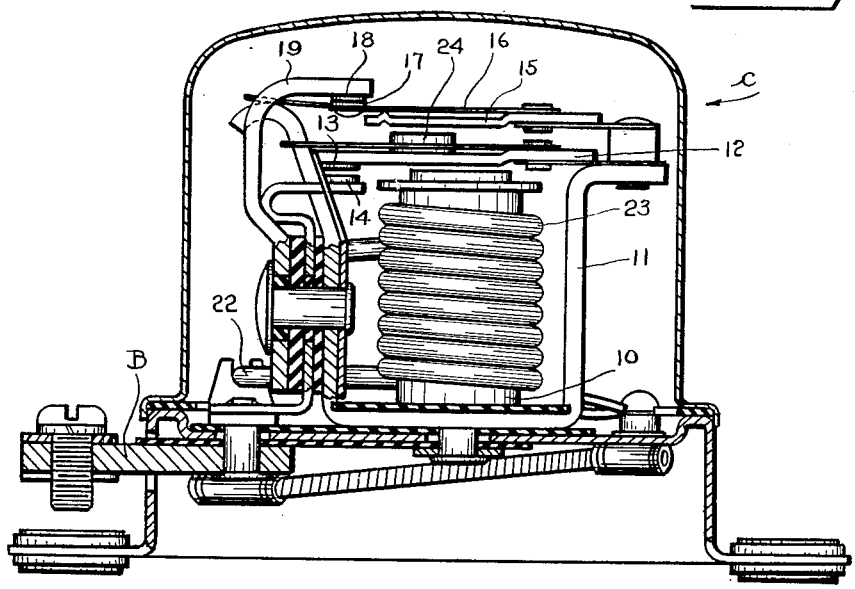
Fig. 6.
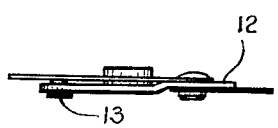
Fig. 7.
Fig. 8.
INVENTOR.
RUSSELL B. HUSSEY
BY
ATTORNEY.

United States Patent Office
2,777,915
Patented Jan. 15, 1957

2,777,915
REGULATOR

Russell B. Hussey, East Longmeadow, Mass., assignor to American Bosch Arma Corporation, a corporation of New York Application May 18, 1953, Serial No. 355,481

3 Claims. (Cl. 200—103)

This invention relates to regulating systems for electric generators and more particularly to such a system for automatically regulating the output of variable speed generators such as used on automotive vehicles and comprising a vibrator type voltage regulator relay and a combined cutout and current limiter relay.

The principal object of the present invention is to provide a new and improved regulating system of the type set forth and a combined cutout and current limiter relay wherein leakage flux on the cutout relay operates the current limiter armature and its contacts.

Another object of the invention is to provide a new and improved regulator system of the type set forth which embodies a voltage regulating relay and a combined cutout and current limiter relay which is relatively simple and inexpensive and which eliminates the compromises of functions and the loss of efficiency and sacrifices of advantages of prior two unit regulator systems which were intended for the performing of the functions of three unit devices.

Another object is to provide a combined current limiter and cutout relay for systems of the type set forth wherein the leakage flux on the cutout relay operates the current limiter relay armature and its contacts and eliminates the necessity of a separate current limiter relay.

Other objects and advantages of the invention will be apparent from the following description taken in connection with the accompanying drawings wherein the preferred form of the invention has been given by way of illustration only.

Referring to the drawings:

Fig. 5 is an end view thereof, partially in section, and with the cover removed;

Fig. 6 is a sectional view taken on line 6—6 of Fig. 2, looking in the direction of the arrows;

Fig. 7 is a top or plan view of the cutout armature; and

Fig. 8 is a side view of the cutout armature.

Figure 1:
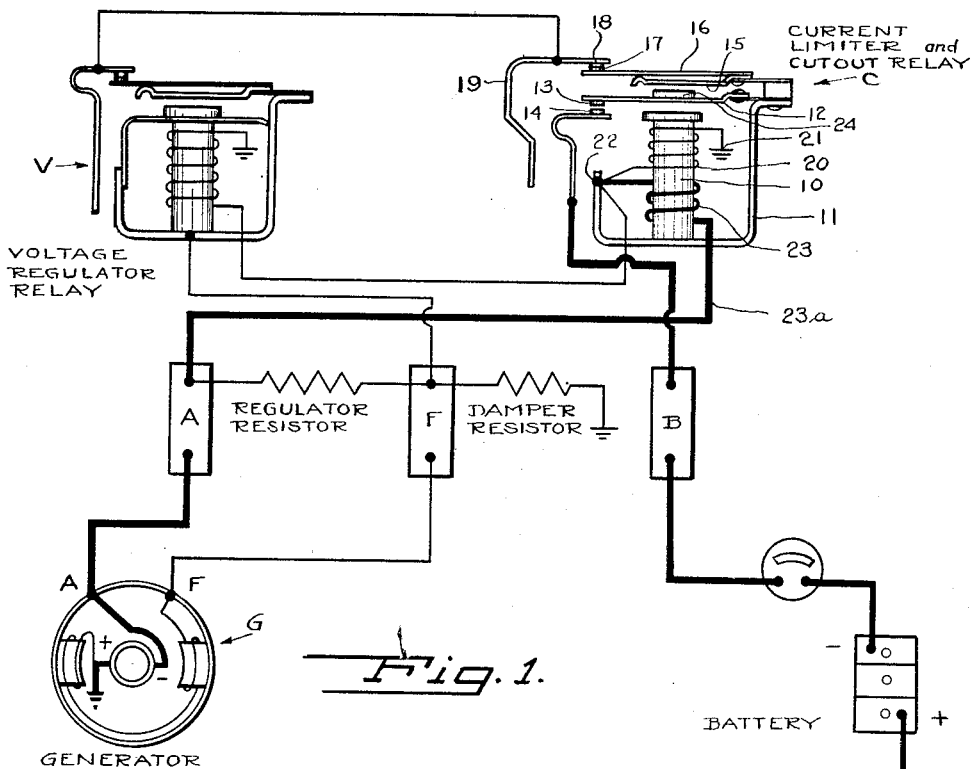
Fig. 1 is a diagrammatic view of a regulating system embodying the invention.
Figure 2:
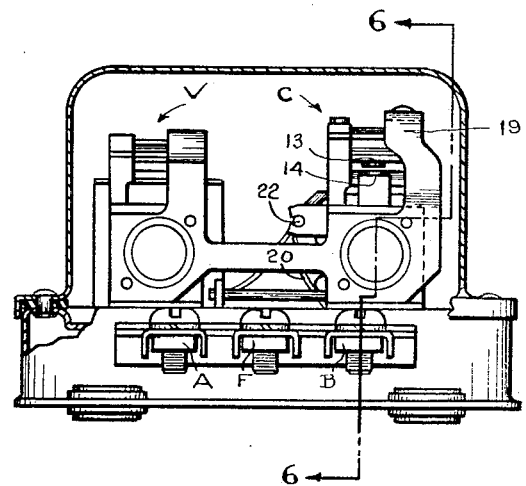
Fig. 2 is a side view, partially in section, of a regulator construction according to the invention.
Figure 3:
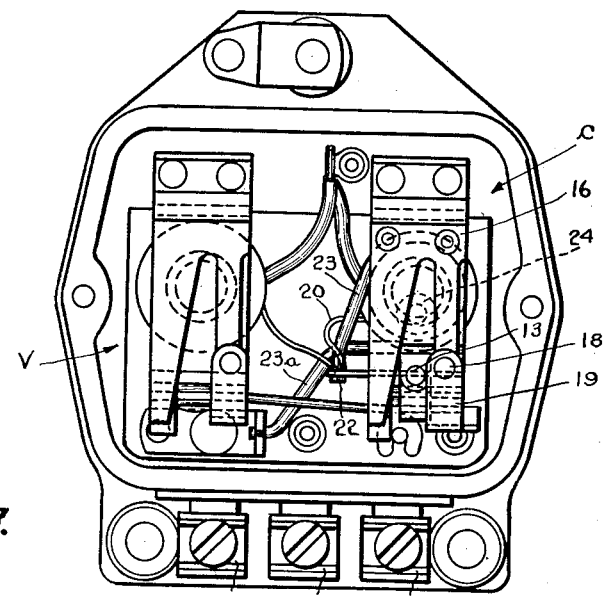
Fig. 3 is a top or plan view thereof.
Figure 4:
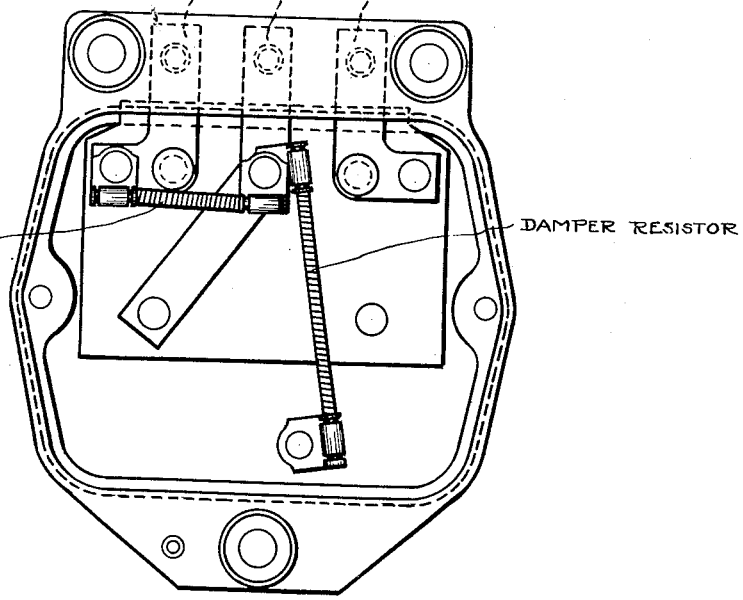
Fig. 4 is a bottom view thereof.

Referring more particularly to the drawings wherein similar reference characters designate corresponding parts throughout, the system shown embodying the invention comprises the generator G, the voltage regulator relay unit V, the combined current limiter and cutout relay C. The system also employs the usual regulator resistor and damper resistor, ammeter and battery as shown.

The voltage regulator relay is generally of conventional type as are the other elements except the combined current limiter and cutout relay which comprises the core 10 and yoke 11. This unit also comprises the cutout armature 12 with its contacts 13 and 14 and the current limiter armature 15 which carries the spring contact carrying arm 16 and which carries the contact 17 adapted to engage contact 18 on yoke 19.

The shunt winding 20 on the combined relay has one end grounded at 21 and its other end is connected at 22 to the generator armature A through winding 23 and its lead 23a.

Winding 23 serves both as reverse current winding for cutout operation and for actuating the current limiter armature.

On the cutout relay armature 12 is provided the button 24 which controls the gap between current limiter armature 15 and armature 12 and provides a path for leakage flux between core 10 and armature 15. If desired, instead of button 24, which is preferably of the same material as core 10 and the other parts of the magnetic system, this member could be formed integral with the cutout relay armature 12 or the current limiter armature 15.

The system includes three circuits as follows:

The conventional heavy current circuit which comes from the generator armature through current winding 23 through yoke 11, through cutout armature 12, through the cutout contacts 13 and 14, thence to the battery terminal B. The second circuit which is also conventional is the shunt coil circuit for the voltage regulator relay coil and the cutout relay shunt coil 20 which are connected in parallel between the armature and ground.

The third circuit which is the field circuit and is also conventional is connected from 22 through the current limiter contacts 13 and 14 then through the voltage regulator relay contacts and then to field F. While the field circuit shown is a convenient arrangement, the same result can be accomplished by other suitable circuits.

In the operation of the device, the leakage flux on the cutout relay through core 10 passes through the button 24 and when this leakage flux has sufficient strength it attracts current limiter armature 15 thus breaking contacts 17 and 18 and until such leakage flux is of sufficient strength to attract armature 15 to break the contacts 17 and 18 as stated, said contacts normally remain in engagement.

It will thus be seen that with the present invention the current limitation operates in a conventional manner except that the usual current limitation relay is eliminated and its function performed by the cutout relay, thus considerably reducing the cost of the device and yet providing a two unit construction capable of satisfactorily performing the operations of a three unit device without any compromises of function or sacrifices of advantages or loss of efficiency usually found in the past where two unit constructions were employed in an endeavor to provide all of the functions of a three unit construction.

From the foregoing it will be seen that I have provided novel, relatively simple and considerably lower cost means for obtaining all of the objects and advantages of the invention.

I claim:

1. In a device of the character described, a core, coil means for energizing said core, a switch and armature means spaced opposite one end of said core, a second armature means for controlling a current limiting switch, said second armature means being spaced opposite said same one end of said core and beyond said first armature means, said core, said first armature means and second armature completing a series magnetic flux path with intervening air gaps therebetween, said first and second armatures being selectively operated in accordance with variable energization of said coil means.

2. In a device of the character described, a core, coil means for energizing said core, a switch and armature means spaced opposite one end of said core, a second armature means for controlling a current limiting switch, said second armature means being spaced opposite said same one end of said core and beyond said first armature means, said core, said first armature means and second armature completing a series magnetic flux path with intervening air gaps therebetween, said first and second armatures being selectively operated in accordance with variable energization of said coil means, and means on the side of said switch opposite said core for controlling the air gap between said switch and said second armature.

3. In a device of the character described, a core, coil means for energizing said core, a switch and armature means spaced opposite one end of said core, a second armature means for controlling a current limiting switch, said second armature means being spaced opposite said same one end of said core and beyond said first armature means, said core, said first armature means and second armature completing a series magnetic flux path with intervening air gaps therebetween, said first and second armatures being selectively operated in accordance with variable energization of said coil means, and means on the side of said switch opposite said core for controlling the air gap between said switch and said second armature, said means being of a material similar to said core.

References Cited in the file of this patent

UNITED STATES PATENTS

| | | |
|---|---|---|
| 922,192 | Rice | May 18, 1909 |
| 1,262,917 | Briggs | Apr. 16, 1918 |
| 1,413,691 | Slough | Apr. 25, 1922 |
| 2,135,977 | Leece | Nov. 8, 1938 |
| 2,225,158 | Crawford | Dec. 17, 1940 |